(12) United States Patent
Followell et al.

(10) Patent No.: US 9,671,314 B2
(45) Date of Patent: *Jun. 6, 2017

(54) SYSTEM AND METHOD TO ASSESS AND REPORT THE HEALTH OF LANDING GEAR RELATED COMPONENTS

(71) Applicant: The Boeing Company, Chicago, IL (US)

(72) Inventors: David A. Followell, Wildwood, MO (US); Jeanne C. Maggiore, Wildwood, MO (US); Wayne R. Majkowski, Florissant, MO (US)

(73) Assignee: THE BOEING COMPANY, Chicago, IL (US)

( * ) Notice: Subject to any disclaimer, the term of this patent is extended or adjusted under 35 U.S.C. 154(b) by 106 days.

This patent is subject to a terminal disclaimer.

(21) Appl. No.: 14/246,143

(22) Filed: Apr. 7, 2014

(65) Prior Publication Data

US 2014/0222325 A1 Aug. 7, 2014

Related U.S. Application Data

(63) Continuation of application No. 12/854,671, filed on Aug. 11, 2010, now Pat. No. 8,712,634.

(51) Int. Cl.
*G01M 17/00* (2006.01)
*G06F 19/00* (2011.01)
(Continued)

(52) U.S. Cl.
CPC ............... *G01M 17/04* (2013.01); *B64F 5/60* (2017.01); *G01M 1/125* (2013.01);
(Continued)

(58) Field of Classification Search
CPC ... G01C 21/165; G01C 23/005; G01M 17/02; G01M 17/04
(Continued)

(56) References Cited

U.S. PATENT DOCUMENTS 2,849,701 A 8/1958 Clark
4,463,428 A 7/1984 Gillaim
(Continued)

FOREIGN PATENT DOCUMENTS

EP 0512866 A1 11/1992
EP 1884453 A2 11/1992
(Continued)

OTHER PUBLICATIONS

Office Action, dated Apr. 15, 2015, regarding U.S. Appl. No. 12/701,033, 37 pages.
(Continued)

*Primary Examiner* — Thomas G Black
*Assistant Examiner* — Wae Louie
(74) *Attorney, Agent, or Firm* — Yee & Associates, P.C.

(57) ABSTRACT

The different advantageous embodiments provide an apparatus comprising a number of landing gear components for a vehicle, a number of systems, and a number of processor units. The number of systems is configured to generate data about the number of landing gear components and the vehicle. The number of processor units is configured to monitor the data and manage health of the number of landing gear components.

22 Claims, 8 Drawing Sheets

(51) Int. Cl.
  *G01M 17/04* (2006.01)
  *G01M 1/12* (2006.01)
  *B64F 5/60* (2017.01)
  G01C 21/16 (2006.01)
  G01C 23/00 (2006.01)
  B64D 45/00 (2006.01)

(52) U.S. Cl.
  CPC .... *B60C 2200/02* (2013.04); *B64D 2045/008* (2013.01); *B64D 2045/0085* (2013.01); *G01C 21/165* (2013.01); *G01C 23/005* (2013.01)

(58) Field of Classification Search
  USPC .............................. 701/31.4, 33.9, 34.3, 500
  See application file for complete search history.

(56) References Cited

U.S. PATENT DOCUMENTS

| | | | |
|---|---|---|---|
| 4,827,416 A | 5/1989 | Kawagoe et al. | |
| 4,918,321 A | 4/1990 | Klenk et al. | |
| 5,036,935 A | 8/1991 | Kohara | |
| 5,203,646 A | 4/1993 | Landsberger et al. | |
| 5,220,263 A | 6/1993 | Onishi et al. | |
| 5,237,404 A | 8/1993 | Tanaka et al. | |
| 5,318,254 A | 6/1994 | Shaw et al. | |
| 5,324,948 A | 6/1994 | Dudar et al. | |
| 5,334,982 A | 8/1994 | Owen | |
| 5,340,056 A | 8/1994 | Guelman et al. | |
| 5,351,621 A | 10/1994 | Tanaka et al. | |
| 5,487,440 A | 1/1996 | Seemann | |
| 5,490,646 A | 2/1996 | Shaw et al. | |
| 5,586,028 A | 12/1996 | Sekine et al. | |
| 5,633,707 A | 5/1997 | Seemann | |
| 5,695,155 A | 12/1997 | Macdonald et al. | |
| 5,726,705 A * | 3/1998 | Imanishi | G01N 21/8806 348/92 |
| 5,831,570 A | 11/1998 | Ammar et al. | |
| 5,832,187 A | 11/1998 | Pedersen et al. | |
| 5,845,002 A | 12/1998 | Heck et al. | |
| 5,845,725 A | 12/1998 | Kawada | |
| 5,995,884 A | 11/1999 | Allen et al. | |
| 6,236,735 B1 * | 5/2001 | Bjorner | G06K 9/2018 250/559.44 |
| 6,266,138 B1 | 7/2001 | Keshavmurthy | |
| 6,293,141 B1 | 9/2001 | Nance | |
| 6,364,026 B1 | 4/2002 | Doshay | |
| 6,476,712 B1 | 11/2002 | Achterholt | |
| 6,565,361 B2 | 5/2003 | Jones et al. | |
| 6,606,563 B2 | 8/2003 | Corcoran, III | |
| 6,671,588 B2 | 12/2003 | Otake et al. | |
| 6,819,265 B2 | 11/2004 | Jamieson et al. | |
| 6,825,758 B1 | 11/2004 | Laitsaari | |
| 6,842,674 B2 | 1/2005 | Solomon | |
| 6,888,446 B2 | 5/2005 | Nantz et al. | |
| 6,904,335 B2 | 6/2005 | Solomon | |
| 6,907,799 B2 | 6/2005 | Jacobsen et al. | |
| 6,947,797 B2 | 9/2005 | Dean et al. | |
| 6,953,094 B2 | 10/2005 | Ross et al. | |
| 6,970,576 B1 | 11/2005 | Tilsley | |
| 6,984,952 B2 | 1/2006 | Peless et al. | |
| 7,076,335 B2 | 7/2006 | Seemann | |
| 7,212,106 B2 | 5/2007 | Katou | |
| 7,218,993 B2 | 5/2007 | Yasukawa et al. | |
| 7,236,861 B2 | 6/2007 | Paradis et al. | |
| 7,250,849 B2 | 7/2007 | Spriggs et al. | |
| 7,280,890 B2 | 10/2007 | Seemann | |
| 7,303,010 B2 | 12/2007 | de Guzman et al. | |
| 7,327,112 B1 | 2/2008 | Hlynka et al. | |
| 7,337,156 B2 | 2/2008 | Wippich | |
| 7,343,222 B2 | 3/2008 | Solomon | |
| 7,414,523 B2 | 8/2008 | Li et al. | |
| 7,417,738 B2 | 8/2008 | Taylor et al. | |
| 7,499,772 B2 | 3/2009 | Wilcox et al. | |
| 7,501,616 B2 | 3/2009 | Wiklof | |
| 7,586,422 B2 | 9/2009 | Goodman et al. | |
| 7,626,513 B2 | 12/2009 | Goodman et al. | |
| 7,627,447 B2 | 12/2009 | Marsh et al. | |
| 7,714,702 B2 * | 5/2010 | Khuzadi | G08B 21/04 340/425.5 |
| 7,765,038 B2 | 7/2010 | Appleby et al. | |
| 7,765,668 B2 | 8/2010 | Townsend et al. | |
| 7,796,018 B2 * | 9/2010 | Khuzadi | G05B 17/02 340/425.5 |
| 7,797,095 B2 | 9/2010 | Rado | |
| 7,813,888 B2 | 10/2010 | Vian et al. | |
| 7,817,026 B2 | 10/2010 | Watabe et al. | |
| 7,832,281 B2 * | 11/2010 | Mian | G07C 3/00 340/870.18 |
| 7,844,364 B2 | 11/2010 | McLurkin et al. | |
| 7,860,618 B2 | 12/2010 | Brandstetter et al. | |
| 7,894,948 B2 | 2/2011 | Stroud | |
| 7,896,113 B1 | 3/2011 | Ramirez | |
| 7,941,261 B2 | 5/2011 | Johnsen | |
| 8,051,547 B2 | 11/2011 | Toh et al. | |
| 8,060,270 B2 | 11/2011 | Vian et al. | |
| 8,078,319 B2 | 12/2011 | Franke et al. | |
| 8,140,250 B2 | 3/2012 | Mian et al. | |
| 8,145,367 B2 | 3/2012 | Khatwa et al. | |
| 8,150,105 B2 | 4/2012 | Mian et al. | |
| 8,181,532 B2 * | 5/2012 | Schmidt | B64C 25/00 73/800 |
| 8,260,485 B1 | 9/2012 | Meuth et al. | |
| 8,262,019 B2 * | 9/2012 | Schmidt | B64F 5/0045 244/100 R |
| 8,504,505 B2 | 8/2013 | Mintah | |
| 8,599,044 B2 | 12/2013 | Maggiore et al. | |
| 8,712,634 B2 | 4/2014 | Followell et al. | |
| 8,773,289 B2 | 7/2014 | Maggiore et al. | |
| 8,812,154 B2 | 8/2014 | Vian et al. | |
| 8,874,305 B2 | 10/2014 | Dolgov et al. | |
| 2002/0073788 A1 | 6/2002 | Hatley et al. | |
| 2003/0048081 A1 | 3/2003 | Seemann | |
| 2003/0089183 A1 | 5/2003 | Jacobsen et al. | |
| 2003/0135327 A1 * | 7/2003 | Levine | G01C 21/165 701/500 |
| 2003/0169335 A1 | 9/2003 | Monroe | |
| 2004/0030571 A1 | 2/2004 | Solomon | |
| 2004/0054507 A1 | 3/2004 | Mott | |
| 2004/0055746 A1 | 3/2004 | Ross et al. | |
| 2004/0073324 A1 * | 4/2004 | Pierro | B61L 27/0083 700/90 |
| 2004/0073411 A1 | 4/2004 | Alston et al. | |
| 2004/0158358 A1 | 8/2004 | Anezaki et al. | |
| 2005/0033517 A1 | 2/2005 | Kondoh et al. | |
| 2005/0073585 A1 | 4/2005 | Ettinger et al. | |
| 2005/0113943 A1 | 5/2005 | Nian | |
| 2005/0126794 A1 | 6/2005 | Palmer et al. | |
| 2005/0217589 A1 | 10/2005 | Daniel et al. | |
| 2005/0251291 A1 | 11/2005 | Solomon | |
| 2006/0085106 A1 | 4/2006 | Gaudiano et al. | |
| 2006/0114531 A1 | 6/2006 | Webb et al. | |
| 2006/0144997 A1 * | 7/2006 | Schmidt | B64F 5/0045 244/100 R |
| 2006/0184291 A1 | 8/2006 | Paradis et al. | |
| 2006/0198952 A1 | 9/2006 | Nagase et al. | |
| 2006/0271251 A1 | 11/2006 | Hopkins | |
| 2007/0062299 A1 * | 3/2007 | Mian | G07C 3/00 73/763 |
| 2007/0081154 A1 | 4/2007 | Mapoles et al. | |
| 2007/0129847 A1 | 6/2007 | Ulmer et al. | |
| 2007/0146728 A1 | 6/2007 | Pristner | |
| 2007/0208442 A1 | 9/2007 | Perrone | |
| 2008/0004749 A1 | 1/2008 | Hostettler | |
| 2008/0021604 A1 | 1/2008 | Bouvier et al. | |
| 2008/0140318 A1 | 6/2008 | Breed | |
| 2008/0143503 A1 * | 6/2008 | Watabe | G01M 17/02 340/438 |
| 2008/0148876 A1 | 6/2008 | Hock et al. | |
| 2008/0154458 A1 | 6/2008 | Brandstetter et al. | |
| 2008/0252489 A1 * | 10/2008 | Naimer | G01C 23/005 340/971 |
| 2008/0270866 A1 | 10/2008 | Choi | |

(56) References Cited

U.S. PATENT DOCUMENTS

| | | | | |
|---|---|---|---|---|
| 2008/0297333 | A1* | 12/2008 | Khuzadi | G05B 17/02 340/438 |
| 2008/0297375 | A1* | 12/2008 | Khuzadi | G08B 21/04 340/945 |
| 2009/0055043 | A1* | 2/2009 | Mian | B61L 27/0094 701/31.4 |
| 2009/0079839 | A1 | 3/2009 | Fischer et al. | |
| 2009/0219393 | A1 | 9/2009 | Vian et al. | |
| 2009/0243828 | A1 | 10/2009 | Hering et al. | |
| 2009/0285491 | A1 | 11/2009 | Ravenscroft et al. | |
| 2010/0017052 | A1* | 1/2010 | Luce | B64C 25/60 701/16 |
| 2010/0023201 | A1 | 1/2010 | Kinney et al. | |
| 2010/0039294 | A1 | 2/2010 | Feyereisen et al. | |
| 2010/0063650 | A1 | 3/2010 | Vian et al. | |
| 2010/0094487 | A1 | 4/2010 | Brinkman et al. | |
| 2010/0211358 | A1 | 8/2010 | Kesler et al. | |
| 2010/0235037 | A1 | 9/2010 | Vian et al. | |
| 2010/0250022 | A1 | 9/2010 | Hines et al. | |
| 2010/0271191 | A1 | 10/2010 | de Graff et al. | |
| 2010/0312387 | A1 | 12/2010 | Jang et al. | |
| 2010/0312388 | A1 | 12/2010 | Jang et al. | |
| 2011/0313614 | A1* | 12/2011 | Hinnant, Jr. | G01M 5/0041 701/33.9 |
| 2012/0038492 | A1* | 2/2012 | Maggiore | G07C 5/008 340/945 |
| 2012/0041639 | A1* | 2/2012 | Followell | B64F 5/0045 701/34.3 |
| 2012/0081540 | A1 | 4/2012 | Jang | |
| 2012/0130701 | A1* | 5/2012 | Khella | G05B 17/02 703/13 |
| 2012/0261144 | A1 | 10/2012 | Vian et al. | |
| 2013/0127642 | A1 | 5/2013 | Maggiore et al. | |
| 2013/0261876 | A1 | 10/2013 | Froom et al. | |

FOREIGN PATENT DOCUMENTS

| | | |
|---|---|---|
| EP | 1193168 A2 | 4/2002 |
| EP | 1619625 A2 | 1/2006 |
| EP | 2208971 A1 | 7/2010 |
| EP | 2259245 A2 | 12/2010 |
| FR | 2930669 A1 | 10/2009 |
| GB | 2308656 A | 7/1997 |
| GB | 2429819 A | 3/2007 |
| JP | 2007183172 A | 7/2007 |
| WO | WO2004081488 A2 | 9/2004 |
| WO | WO2005113261 A1 | 12/2005 |
| WO | WO2006053433 A1 | 5/2006 |
| WO | WO2007080584 A2 | 7/2007 |
| WO | WO2008127468 A2 | 10/2008 |
| WO | WO2009142933 A2 | 11/2009 |
| WO | WO2010141180 A2 | 12/2010 |
| WO | WO2011119634 A1 | 9/2011 |
| WO | WO2012021177 A1 | 2/2012 |
| WO | WO2012021179 A2 | 2/2012 |
| WO | WO2012047479 A1 | 4/2012 |

OTHER PUBLICATIONS

Notice of allowance, dated Jan. 28, 2015, regarding U.S. Appl. No. 12/560,569, 6 pages.
Final Office Action, dated Apr. 2, 2014, regarding U.S. Appl. No. 12/372,616, 24 pages.
Final Office Action, dated Feb. 21, 2014, regarding U.S. Appl. No. 12/701,033, 31 pages.
Notice of Allowance, dated Apr. 9, 2014, regarding U.S. Appl. No. 12/404,493, 20 pages.
Final Office Action, dated Feb. 28, 2014, regarding U.S. Appl. No. 12/560,569, 43 pages.
Notice of Allowance, dated Feb. 27, 2014, regarding U.S. Appl. No. 12/730,594, 11 pages.
Office Action, dated Apr. 8, 2014, regarding U.S. Appl. No. 12/897,158, 33 pages.
Final Office Action, dated Sep. 8, 2014, regarding U.S. Appl. No. 12/897,158 36 pages.
Final Office Action, dated Feb. 19, 2014, regarding U.S. Appl. No. 13/086,521, 18 pages.
Office Action, dated Aug. 8, 2014, regarding U.S. Appl. No. 13/086,521, 20 pages.
Kesler et al., "Automated Postflight Troubleshooting Sensor Array," U.S. Appl. No. 12/701,033, filed Feb. 5, 2010, 54 pages.
GB Combined Search and Examination Report dated Jun. 10, 2010 regarding application GB1003830.5, 8 page.s.
GB Search Report and Examination Report dated Jun. 14, 2011 regarding application GB1100763.0, applicant's reference P51280GB/AER/LJW, applicant The Boeing Company, 9 pages.
International Search Report for application PCT/US2010/033917 dated Nov. 26, 2010, 1 page.
International Search Report regarding Application PCT/US2011/029466, dated Jun. 16, 2011, 9 pages.
PCT Search Report and Written Opinion dated Jun. 8, 2011 regarding international application PCT/US2011/029766, applicant's reference 10-0173PCT, applicant The Boeing Company, 9 pages.
PCT Search Report dated Feb. 16, 2012 regarding international application PCT/US2011/030150, applicant's reference 10-0174PCT, applicant The Boeing Company, 6 pages.
PCT Search Report dated Feb. 7, 2012 regarding international application PCT/US2011/051830, applicant's reference 10-0602PCT, applicant The Boeing Company, 4 pages.
"In-Sight Line Scan Vision System," Webinar, COGNEX, retrieved Feb. 5, 2010 http://www.cognex.com.
"Unmanned Aerial Vehicle (UAV) ZALA 421-04M chosen for Aerial Monitoring of Forest Fires," published by news. wood.ru, Feb. 2010, 3 pages.
DeVault "Robotic system for underwater inspection of bridge piers," IEEE Instrumentation & Measurement Magazine, vol. 3, Iss. 3, Sep. 2000, pp. 32-37 (abstract).
Frost, "A Practical Guide to Using the In-Sight 5604 Line Scan Vision System—Integration Note," Mar. 23, 2009, In-Sight Vision Systems, COGNEX, 20 pages.
Gunatilake et al., "Image Understanding Algorithms for Remote Visual Inspection of Aircraft Surfaces," Proceedings of the SPIE conference on Machine Vision Application in Industrial Inspection V, Copyright 1997, 12 pages.
Ollero, "Multiple Heterogeneous Unmanned Aerial Vehicles," Springer Tracts in Advanced Robotics, vol. 37, copyright 2007, 233 pages (abstract).
Office Action dated May 10, 2011 regarding U.S. Appl. No. 12/372,616, 27 pages.
Final Office Action dated Oct. 28, 2011 regarding U.S. Appl. No. 12/372,616, 30 pages.
Office Action dated Feb. 15, 2012 regarding U.S. Appl. No. 12/372,616, 22 pages.
Final Office Action dated Jul. 12, 2012 regarding U.S. Appl. No. 12/372,616, 23 pages.
Office Action, dated Dec. 21, 2012, regarding U.S. Appl. No. 12/372,616, 39 pages.
Office Action, dated Sep. 10, 2013, regarding U.S. Appl. No. 12/372,616, 25 pages.
Office Action dated Oct. 4, 2011 regarding U.S. Appl. No. 12/701,033, 24 pages.
Final Office Action dated Apr. 13, 2012 regarding U.S. Appl. No. 12/701,033, 18 pages.
Office Action dated Aug. 31, 2012 regarding U.S. Appl. No. 12/701,033, 28 pages.
Final Office Action, dated Jan. 8, 2013, regarding U.S. Appl. No. 12/701,033, 27 pages.
Office Action, dated Sep. 12, 2013, regarding U.S. Appl. No. 12/701,033, 25 pages.
Office Action, dated Apr. 13, 2012, regarding U.S. Appl. No. 12/404,493, 22 pages.
Final Office Action dated Oct. 3, 2012 regarding U.S. Appl. No. 12/404,493, 18 pages.
Office Action, dated Jul. 18, 2013, regarding U.S. Appl. No. 12/404,493, 42 pages.

(56) References Cited

OTHER PUBLICATIONS

Office Action dated Feb. 21, 2012 regarding U.S. Appl. No. 12/479,667, 25 pages.
Office Action dated Feb. 24, 2012 regarding U.S. Appl. No. 12/560,569, 27 pages.
Final Office Action dated Jul. 24, 2012 regarding U.S. Appl. No. 12/560,569, 23 pages.
Office Action, dated Aug. 28, 2013, regarding U.S. Appl. No. 12/560,569, 46 pages.
Office Action dated Aug. 16, 2012 regarding U.S. Appl. No. 12/730,594, 25 pages.
Final Office Action, dated Dec. 20, 2012, regarding U.S. Appl. No. 12/730,594, 35 pages.
Office Action, dated May 23, 2013, regarding U.S. Appl. No. 12/70,594, 28 pages.
Office Action dated Aug. 31, 2012 regarding U.S. Appl. No. 12/854,646, 18 pages.
Final Office Action, dated Mar. 7, 2013, regarding U.S. Appl. No. 12/854,646, 22 pages.
Notice of Allowance, dated Jul. 31, 2013, regarding U.S. Appl. No. 12/854,646, 19 pages.
Office Action, dated Mar. 28, 2013, regarding U.S. Appl. No. 12/854,671, 37 pages.
Final Office Action, dated Jul. 12, 2013, regarding U.S. Appl. No. 12/854,671, 17 pages.
Notice of Allowance, dated Dec. 13, 2013, regarding U.S. Appl. No. 12/854,671, 12 pages.
Office Action, dated Dec. 6, 2012, regarding U.S. Appl. No. 12/897,158, 51 pages.
Final Office Action, dated Jun. 26, 2013, regarding U.S. Appl. No. 12/897,158 38 pages.
Office Action dated Jun. 15, 2012 regarding U.S. Appl. No. 13/086,521, 18 pages.
Final Office Action, dated Jan. 14, 2015, regarding U.S. Appl. No. 13/086,521, 23 pages.
Final Office Action, dated Dec. 29, 2014, regarding U.S. Appl. No. 12/560,569, 17 pages.
Office Action, dated Sep. 16, 2015, regarding U.S. Appl. No. 12/372,616, 23 pages.
Notice of Allowance, dated Apr. 7, 2016, regarding U.S. Appl. No. 12/372,616, 14 pages.
European Patent Office Communication, dated Mar. 3, 2016, regarding Application No. 11714174.7, 5 pages.
Final Office Action, dated Jul. 1, 2016, regarding U.S. Appl. No. 12/701,033, 28 pages.
Verma et al., "Wavelet-Based Neural Net Application for Feature Detection and Classification," Journal of Neural, Parallel & Scientific Computations, vol. 11, No. 1 & 2, Mar. 2003, 6 pages.
Notice of Allowance, dated Sep. 1, 2016, regarding U.S. Appl. No. 12/701,033, 12 pages.
Office Action, dated Mar. 24, 2016, regarding U.S. Appl. No. 12/701,033, 38 pages.
Notice of Allowance, dated Oct. 28, 2014, regarding U.S. Appl. No. 12/897,158, 12 pages.
European Patent Office Communication, dated Feb. 16, 2017, regarding Application No. 11714174.7, 5 pages.

* cited by examiner

SYSTEM AND METHOD TO ASSESS AND REPORT THE HEALTH OF LANDING GEAR RELATED COMPONENTS

CROSS REFERENCE TO RELATED APPLICATIONS

This application is a continuation of application No. 12/854,671, filed Aug. 11, 2010, the entire disclosure of which is incorporated by reference herein.

BACKGROUND INFORMATION

1. Field

The present disclosure relates generally to a data processing system, and more particularly to a system for health management. Still more particularly, the present disclosure relates to management of the health and status of landing gear components.

2. Background

Aircraft include different undercarriage components to support an aircraft on the ground, during taxi, and for take-off and landing operations. These components are manually inspected at discrete intervals by ground personnel to assess and record appropriate measurements, as well as determine whether maintenance operations are required. These inspections typically occur at scheduled maintenance intervals for the aircraft. The health of these undercarriage components impact whether an aircraft is cleared for use or will encounter delay or even grounding in order to address issues detected.

Aircraft weight and center of gravity are other factors that impact flight delay and operational clearance. Aircraft weight is calculated based on the required fuel load, freight, and the number of passengers multiplied by the average weight of all the passengers and their baggage. Aircraft center of gravity is calculated based on aircraft weight and theoretical weight distribution. During loading operations of an aircraft, aircraft weight and aircraft center of gravity can be impacted when the actual weight and center of gravity differ from the theoretical calculations. This difference can result in unexpected fuel consumption and handling qualities for the aircraft during flight.

Therefore, it would be advantageous to have a method and apparatus that addresses one or more of the issues discussed above.

SUMMARY

The different advantageous embodiments provide an apparatus comprising a number of landing gear components for a vehicle, a number of systems, and a number of processor units. The number of systems is configured to generate data about the number of landing gear components and the vehicle. The number of processor units is configured to monitor the data and manage the health of the number of landing gear components.

The different advantageous embodiments further provide a method for managing the health of a number of landing gear components of a vehicle. Data is received from a number of systems associated with the number of landing gear components and the vehicle. A determination is made as to whether the data received is within pre-defined threshold values. In response to a determination that the data is not within the pre-defined threshold values, a number of component issues associated with the data are identified.

The different advantageous embodiments further provide a method for managing a center of gravity for a vehicle during load operations. Initiation of a load operation is detected for a vehicle. A weight is calculated on each landing gear of the vehicle to identify a center of gravity. Results having the center of gravity location are actively outputted to appropriate users during the load operation. The results are displayed on a user interface.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
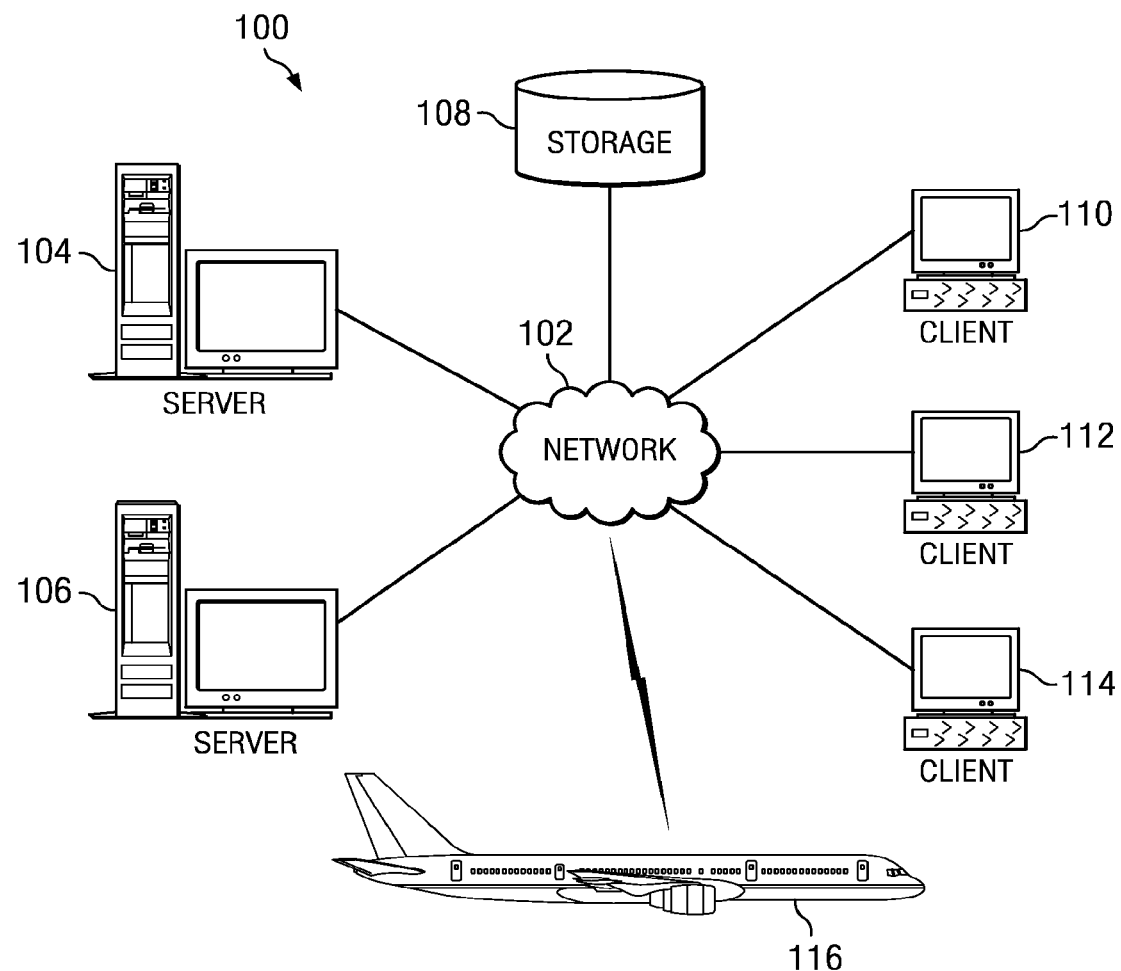
FIG. 1 is an illustration of a network of data processing systems in which an advantageous embodiment may be implemented.
Figure 2:
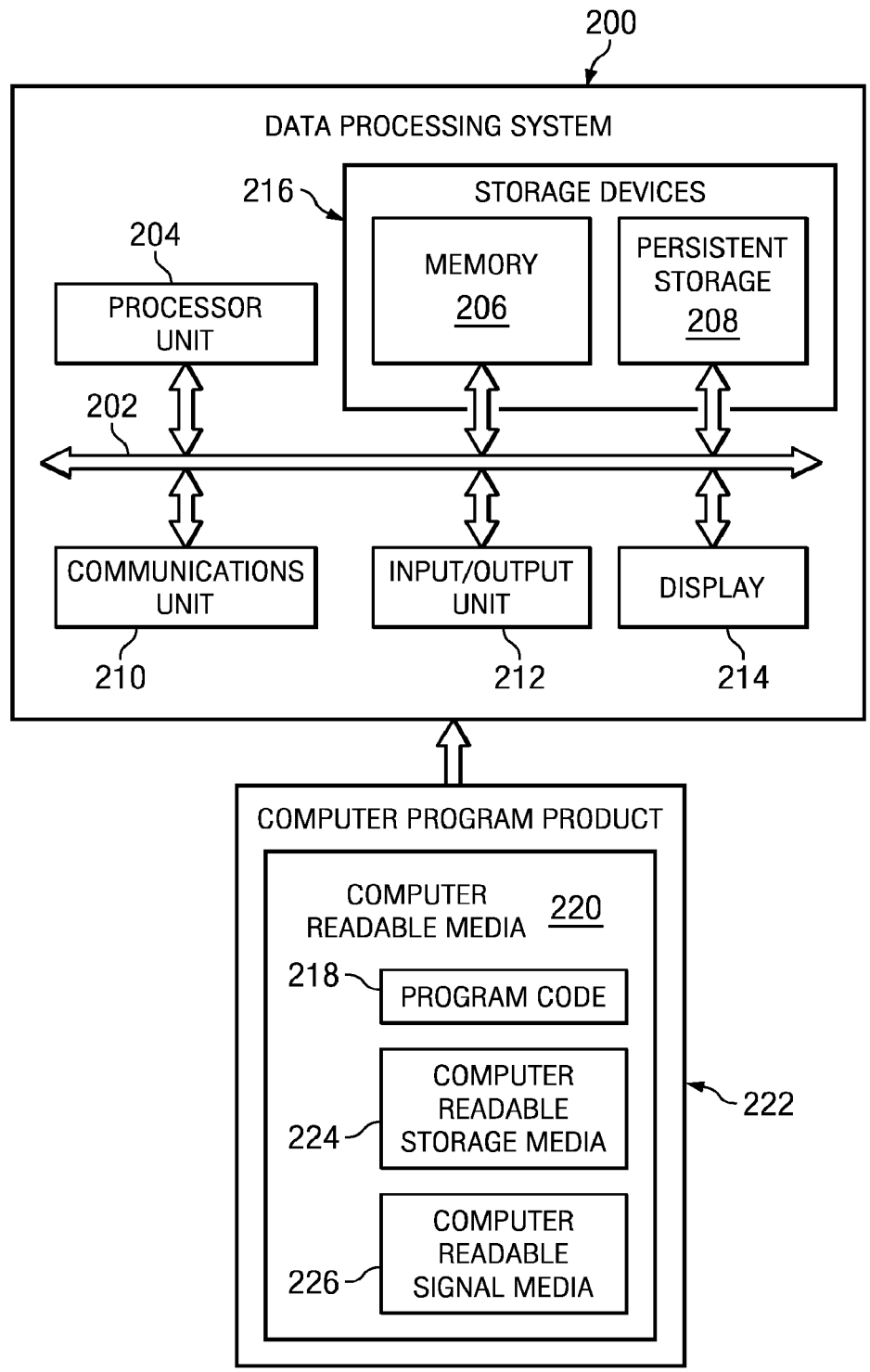
FIG. 2 is an illustration of a data processing system in accordance with an advantageous embodiment.

With reference now to the figures and in particular with reference to FIGS. 1-2, diagrams of data processing environments are provided in which the advantageous embodiments of the present invention may be implemented. It should be appreciated that FIGS. 1-2 are only illustrative and are not intended to assert or imply any limitation with regard to the environments in which different embodiments may be implemented. Many modifications to the depicted environments may be made.

With reference now to the figures, FIG. 1 is an illustration of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers, hand-held devices or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and client 114 may be computers. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, an illustration of a block diagram of a data processing system is depicted in accordance with an advantageous embodiment. Data processing system 200 is an example of a data processing system that may be used to implement servers and clients, such as server 104 and client 110 in FIG. 1. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, a shared processor, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The different advantageous embodiments recognize and take into account that current inspection frequency of landing gear suite components by maintenance personnel requires aircraft operators to employ additional personnel and locate them strategically within their network. Personnel are required to manually and visually inspect appropriate measurands, record the results, and take appropriate actions. Human error is a by-product of the manual inspection and calculation of these processes.

Current inspection processes result in maintenance actions that are reactive in nature, resulting in gate delays and cancelled flights. These inspections occur at discrete intervals, which encompass multiple flights, thus providing the potential for issues to arise unnoticed between individual flights. The information collected during these current processes is not available to maintenance and operation planners in a sufficiently timely manner to make the most efficient use of the aircraft.

Thus, the different advantageous embodiments provide an apparatus comprising a number of landing gear components for a vehicle, a number of systems, and a number of processor units. The number of systems is configured to generate data about the number of landing gear components and the vehicle. The number of processor units is configured to monitor the data and manage the health of the number of landing gear components.

The different advantageous embodiments further provide a method for managing the health of a number of landing gear components of a vehicle. Data is received from a number of systems associated with the number of landing gear components and the vehicle. A determination is made as to whether the data received is within pre-defined threshold values. In response to a determination that the data is not within the pre-defined threshold values, a number of component issues associated with the data are identified.

The different advantageous embodiments further provide a method for managing a center of gravity for a vehicle during load operations. Initiation of a load operation is detected for a vehicle. A weight is calculated on each landing gear of the vehicle to identify a center of gravity. Results having the center of gravity location are actively outputted during the load operation. The results are displayed on a user interface.

Figure 3:
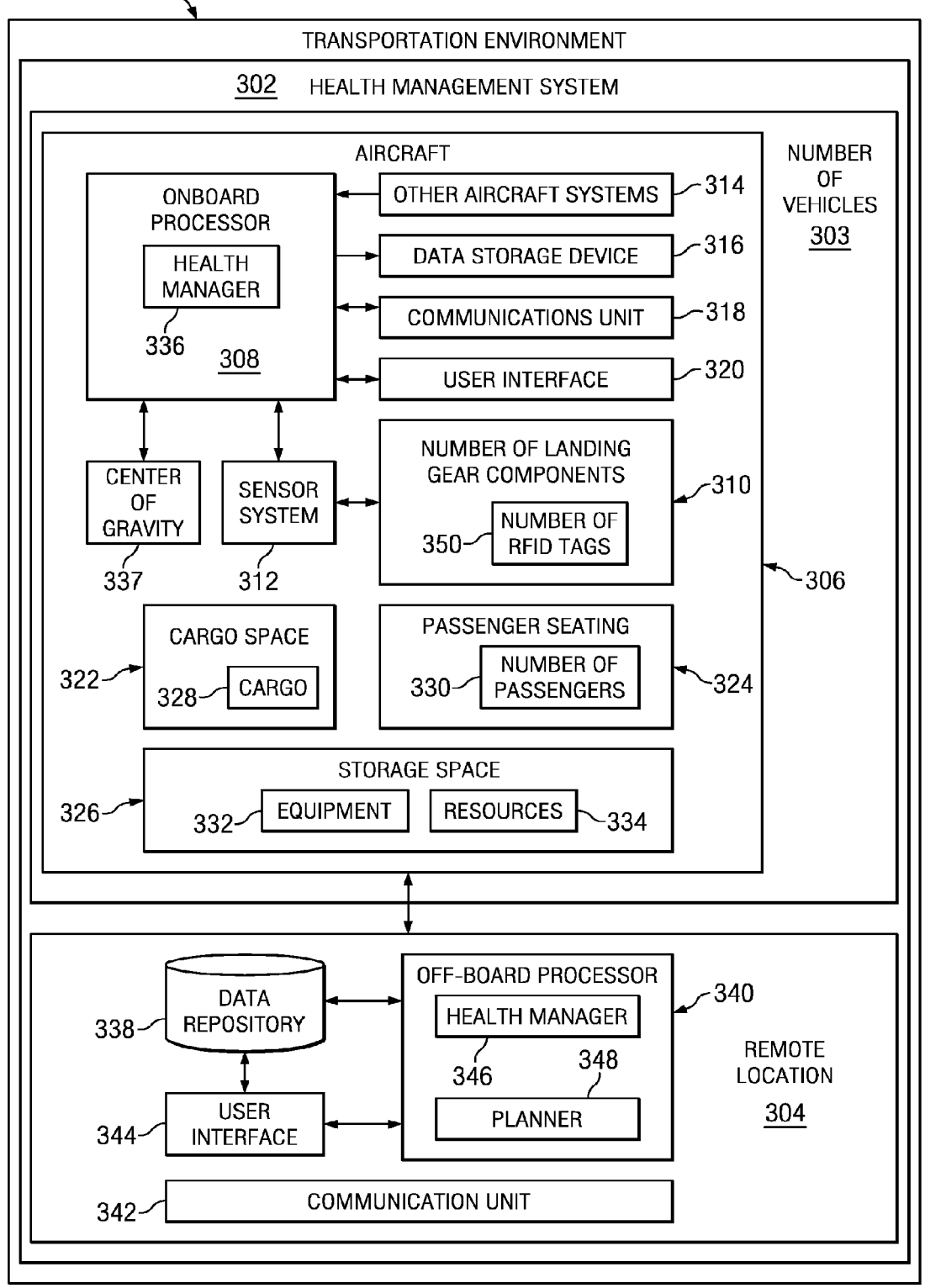
FIG. 3 is an illustration of a transportation environment in accordance with an advantageous embodiment.

With reference now to FIG. 3, an illustration of a transportation environment is depicted in accordance with an advantageous embodiment. Transportation environment 300 may be implemented using a network environment, such as network data processing system 100 in FIG. 1, for example.

Transportation environment 300 includes health management system 302. Health management system 302 may be implemented using one or more data processing systems, such as data processing system 200 in FIG. 2. Health management system 302 includes number of vehicles 303 and remote location 304. Number of vehicles 303 and remote location 304 may communicate using a wireless network, in an illustrative example.

Number of vehicles 303 may be any type of vehicle suitable for transportation. Number of vehicles 303 may include, for example, without limitation, aircraft, rotorcraft, ground vehicles, sea vessels, submarines, spacecraft, manned vehicles, unmanned vehicles, and/or any other suitable vehicle. Aircraft 306 is an illustrative example of one implementation of number of vehicles 303.

Aircraft 306 includes onboard processor 308, number of landing gear components 310, sensor system 312, other aircraft systems 314, data storage device 316, communications unit 318, user interface 320, cargo space 322, passenger seating 324, and storage space 326.

Cargo space 322 may be any location or area suitable for storing cargo 328. Passenger seating 324 may be any location or area suitable for holding number of passengers 330 during transport of aircraft 306. Storage space 326 may be any location or area suitable for storing equipment 332 and/or resources 334. Equipment 332 may include, for example, without limitation, beverage carts, galley equipment, first aid equipment, and/or any other suitable aircraft equipment. Resources 334 may include, for example, without limitation, fuel, food, beverages, oxygen, and/or any other suitable resources for aircraft 306.

Onboard processor 308 is an illustrative example of one implementation of processor unit 204 in FIG. 2. Onboard processor 308 includes health manager 336. Health manager 336 is a software agent that continually receives data from sensor system 312 and/or other aircraft systems 314. Health manager 336 uses the data to assess, diagnose, transmit, and report on the health of number of landing gear components 310 and/or the status of aircraft center of gravity 337. Health manager 336 uses communications unit 318 to transmit information about the health of number of landing gear components 310 and/or status of center of gravity 337 to remote location 304. Communications unit 318 is an illustrative example of one implementation of communications unit 210 in FIG. 2.

Center of gravity 337 is the point at which aircraft 306 would balance if it were possible to suspend it at that point. It is the mass center of aircraft 306, or the theoretical point at which the entire weight of aircraft 306 is assumed to be concentrated.

Other aircraft systems 314 may include, for example, without limitation, flight control systems, guidance systems, navigation systems, and/or any other suitable aircraft systems. Parametric data may be received by onboard processor 308 from other aircraft systems 314 and used by health manager 336 in conjunction with sensor data from sensor system 312, for example.

Remote location 304 may be any location off-board number of vehicles 303. Remote location 304 may be, for example, without limitation, a back office, a ground station, a vehicle serving as a remote location, and/or any other suitable location remote from number of vehicles 303. Remote location 304 includes data repository 338, off-board processor 340, communications unit 342, and user interface 344.

Data repository 338 may be used to store information received from health manager 336 of aircraft 306, in an illustrative example. Data repository 338 may also support a number of algorithms used by off-board processor 340 to assess information received from health manager 336. In an illustrative example, health manager 336 of aircraft 306 may receive data from sensor system 312 and/or other aircraft systems 314, and transmit the data to off-board processor 340 for health assessment, diagnoses, and reporting. In another illustrative example, health manager 336 may process and assess the data received from sensor system 312 and/or other aircraft systems 314 to diagnose a number of issues, and send the diagnostic results to off-board processor 340 for further processing, such as maintenance or operational planning.

Off-board processor 340 may be a number of processors, such as one or more of processor unit 204 in FIG. 2. Off-board processor 340 includes health manager 346 and planner 348. In an advantageous embodiment, health manager 346 receives data collected by sensor system 312 and transmitted by health manager 336 to off-board processor 340. Health manager 346 uses the data received to assess, diagnose, transmit, and report on the health of number of landing gear components 310 and/or the status of center of gravity 337. Health manager 346 may also transmit information about the health of number of landing gear components 310 and/or the status of center of gravity 337 to planner 348.

Planner 348 is a software agent that uses information about the health of number of landing gear components 310 and/or the status of center of gravity 337 to plan maintenance and operational tasks. Planner 348 may display plans on user interface 344, in an illustrative example. User interface 344 is an illustrative example of one implementation of display 214 in FIG. 2. In another advantageous embodiment, user interface 344 may also include peripheral devices, such as a keyboard and mouse, for example.

During operation of aircraft 306, sensor system 312 sends sensor data and other aircraft systems 314 sends other data to onboard processor 308, where the data is monitored by health manager 336 and/or transmitted to health manager 346 at remote location 304 for management. The data may be sent continually or the data transmission may be triggered by an event, such as initiating landing gear retraction or extension, for example. The event may be, for example, a periodic event, such as the expiration of a timer. In an illustrative example, the periodic event may occur every second, every minute, or after some other suitable period of time. In other examples, the event may be non-periodic. For example, the data may be received when the landing gear is activated. The data may continue to be received until the aircraft reaches a taxiway from the runway, the gate or some other location. This allows for real-time management of landing gear component health. Real-time may refer to sending the data to and/or from the systems as fast as possible, in an illustrative example. The data transmitted may be synchronous or asynchronous, in an illustrative example. Sensor system 312 detects a number of different measurements from number of landing gear components 310. Health manager 336 and/or health manager 346 continually monitors the data received to perform a number of processes including, without limitation, determining whether the measurements detected are within pre-defined threshold values, monitoring and recording actual values even if within thresholds, calculating other metrics such as center of gravity, number of landings remaining for tires or brakes, fatigue life expended, and/or any other suitable process. A pre-defined threshold value may be any value that represents a normal operation value, for example.

When health manager 336 detects a value outside a pre-defined threshold value, health manager 336 assesses the data, which may include the value, identification of the component, configuration information for the component, location of the component, and any other suitable information used to assess the health of the component. Health manager 336 may transmit the information to remote location 304 for further processing and/or generate an alert with information about the health of the component. Health manager 336 may display the alert using user interface 320.

Number of landing gear components 310 may include number of radio frequency identification (RFID) tags 350. Number of RFID tags 350 may include configuration information associated with number of landing gear components 310. In an advantageous embodiment, each component in number of landing gear components 310 is associated with a RFID tag from number of RFID tags 350.

Configuration information may be any type of historical information about a particular component. For example, configuration information may include, without limitation, part numbers, serial numbers, manufacturing data, lot codes, maintenance history, and/or any other historical information about a particular component. Sensor system 312 may include a RFID reader that detects this configuration information along with other information about the component, and transmits the configuration information to health manager 336 for assessment.

The illustration of transportation environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, health management system 302 may include one instance of health manager 346 at remote location 304, and process sensor data at remote location 304, transmitting alerts and information to aircraft 306 over a network, in one advantageous embodiment. In another advantageous embodiment, aircraft 306 may be implemented without one or more of cargo space 322, passenger seating 324, and storage space 326.

Figure 4:
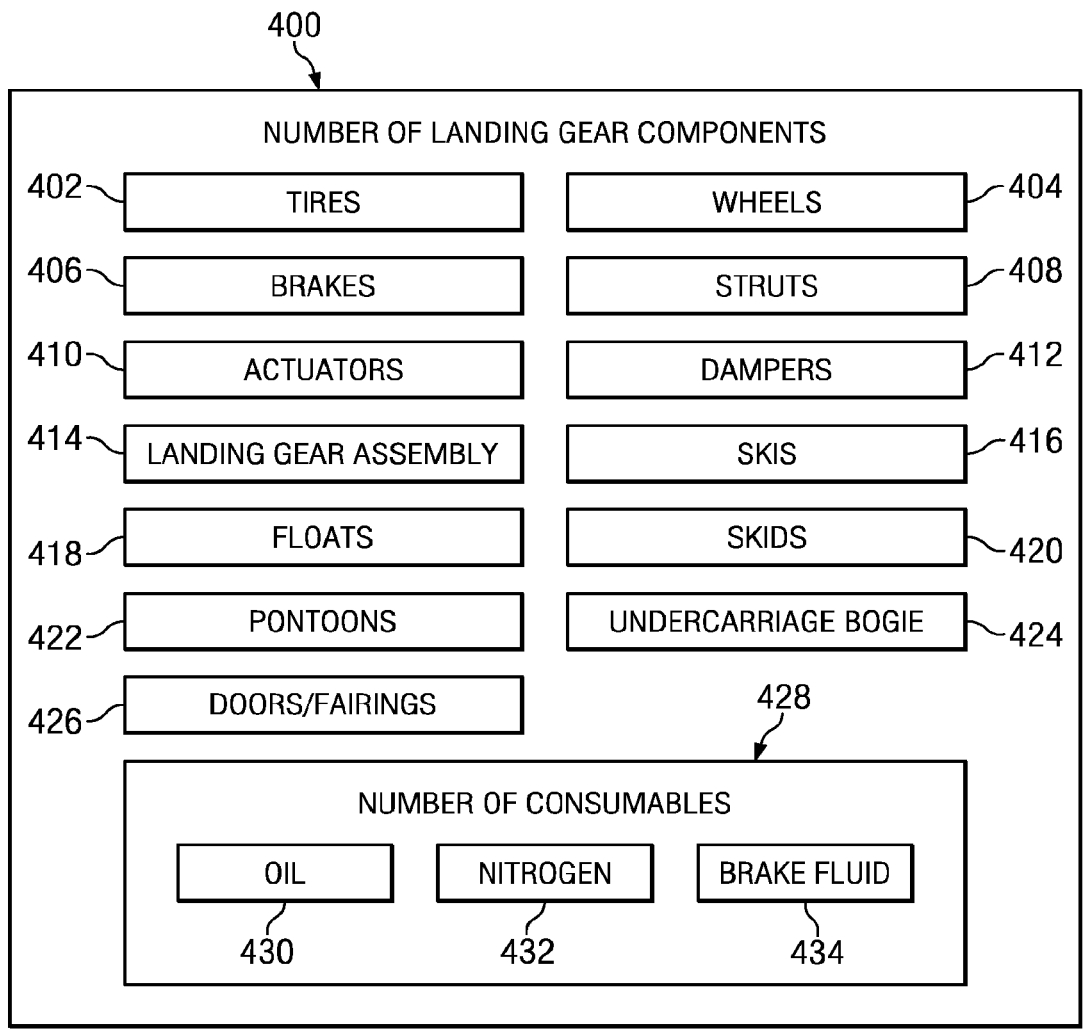
FIG. 4 is an illustration of a number of landing gear components in accordance with an advantageous embodiment.

With reference now to FIG. 4, an illustration of a number of landing gear components is depicted in accordance with an advantageous embodiment. Number of landing gear components 400 is an illustrative example of one implementation of number of landing gear components 310 in FIG. 3.

Number of landing gear components 400 may include, for example, without limitation, tires 402, wheels 404, brakes 406, struts 408, actuators 410, dampers 412, landing gear assembly 414, skis 416, floats 418, skids 420, pontoons 422, undercarriage bogie 424, doors/fairings 426, and number of consumables 428.

Landing gear assembly 414 may be any combination of one or more tires 402, wheels 404, brakes 406, struts 408, actuators 410, dampers 412, skis 416, floats 418, skids 420, and pontoons 422. Landing gear assembly 414 may be retractable or non-retractable in different illustrative examples. A retractable gear assembly is any landing gear assembly that is configured to extend and retract. Undercarriage bogie 424 is a chassis or framework carrying a number of wheels. Doors/fairings 426 is an opening in the fuselage or wing sections of an aircraft through which a retractable gear assembly may extend and retract. Number of consumables 428 are any type of product, substance, or material used in conjunction with one or more other components of number of landing gear components 400. Number of consumables 428 may be, for example, without limitation, oil 430, nitrogen 432, brake fluid 434, and/or any other suitable consumable.

The illustration of number of landing gear components 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
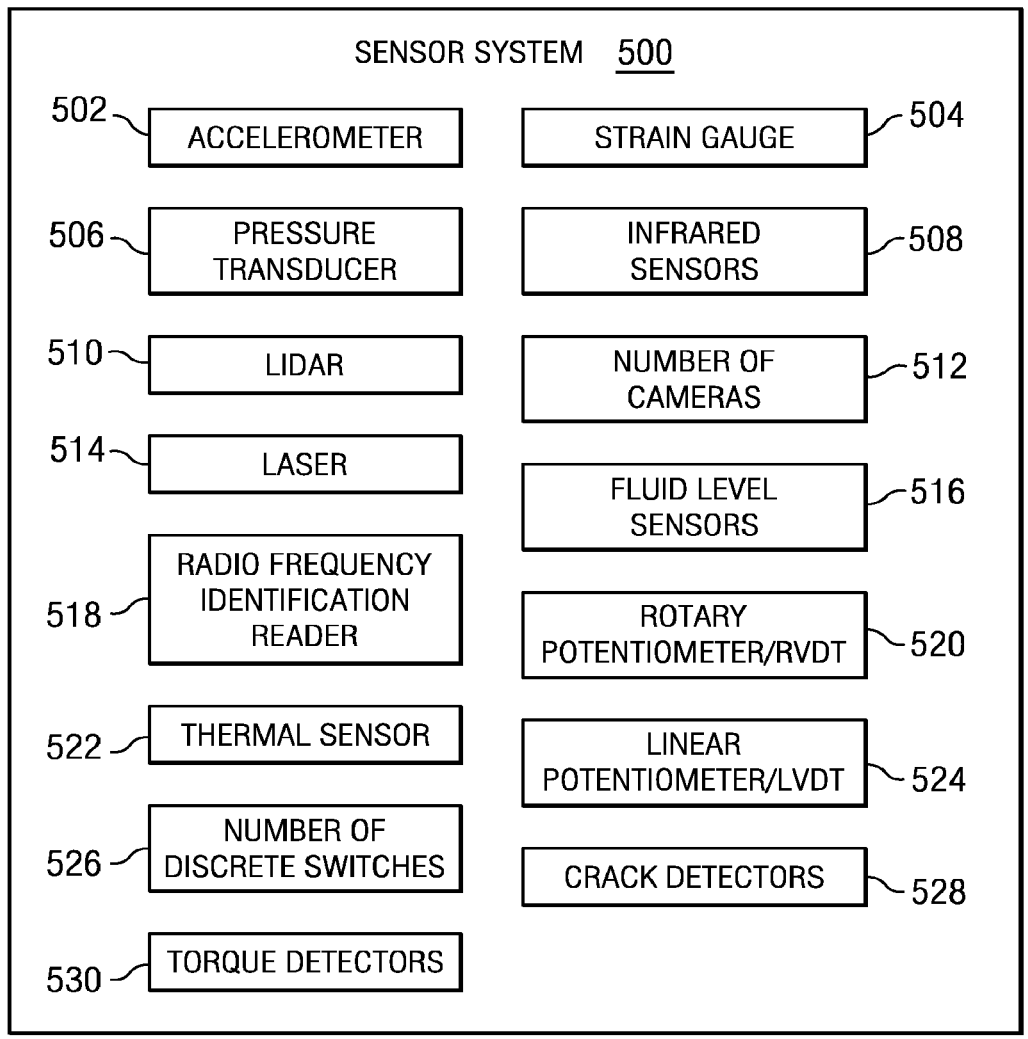
FIG. 5 is an illustration of a sensor system in accordance with an advantageous embodiment.

With reference now to FIG. 5, an illustration of a sensor system is depicted in accordance with an advantageous embodiment. Sensor system 500 is an illustrative example of one implementation of sensor system 312 in FIG. 3.

Sensor system 500 may include, without limitation, accelerometer 502, strain gauge 504, pressure transducer 506, infrared sensors 508, lidar 510, number of cameras 512, laser 514, fluid level sensors 516, radio frequency identification reader 518, rotary potentiometer 520, thermal sensor 522, linear potentiometer 524, number of discrete switches 526, crack detectors 528, and torque detectors 530.

Accelerometer 502 measures the acceleration of an object, such as aircraft 306 in FIG. 3. Accelerometer 502 may also measure the vibration of actuators, in this illustrative example. Strain gauge 504 measures strain experienced by an object, such as aircraft 306 in FIG. 3. Measurements taken by strain gauge 504 may be used to calculate the weight of the object, such as aircraft 306 in FIG. 3, or the torque of brakes, for example. Pressure transducer 506 measures the force per unit area and generates a signal as a function of the pressure imposed. Infrared sensors 508 is a number of infrared imaging sensors that detect wavelengths longer and lower than that of visible light and can be used to measure the temperature of landing gear components, such as a tire or brake.

Lidar 510 is an optical remote sensing technology that measures properties of scattered light to measure landing gear component wear and damage, such as tire wear and damage profiles, for example. Number of cameras 512 may be any type of device used to capture images, including black and white cameras, color cameras, thermal imaging cameras, video cameras, and the like, which can be used to inspect wear and damage on tires and brakes. Laser 514 emits electromagnetic radiation which can be used to measure landing gear component wear and damage profiles, such as tire or wheel wear and damage profiles, for example. Fluid level sensors 516 is a number of sensors configured to detect the level of a consumable fluid, such as number of consumables 428 in FIG. 4, for example. Fluid level sensors 516 may be, in one illustrative example, capacitive probes which measure the level of a fluid in a reservoir.

Radio frequency identification tag reader 518 detects and reads information from radio identification tags, such as number of RFID tags 350 of number of landing gear components 310 in FIG. 3. Rotary potentiometer 520, or a rotary variable differential transformer (RVDT), is a device to measure the rotary position and/or movement of a number of components or the relationship between a number of components. Rotary potentiometers and RVDT may be used to monitor the extension of the landing gear strut. Thermal sensor 522 is a device for measuring temperature. Thermal sensor 522 may measure ambient temperature, component temperature, and/or any other suitable temperature. Linear potentiometer 524, or a linear variable differential transformer (LVDT), measures the linear position and movement of a number of components, and measures the wear of landing gear components, such as brake wear, for example.

Number of discrete switches 526 is used to determine where a number of components are located. For example, number of discrete switches 526 may be configured to measure an actuator if an actuator is locked in the open or closed position. The time between the open or closed position can be used to determine actuation time which can infer the health of the actuator, for example. Crack detectors 528 are sensors used to detect the presence of cracks in the number of components. Torque detectors 530 are sensors that detect the amount of torsional load a number of components are subjected to. For example, a torque detector can be used to measure the braking force or the force applied by a rotary actuator.

In an illustrative example, sensor system 500 may generate sensor data for a number of landing gear components, such as number of landing gear components 400 in FIG. 4.

For example, pressure transducer 506 may generate data on the pressure of tires 402 in FIG. 4. In another illustrative example, pressure transducer 506 may generate data on the pressure of fluids in struts 408 in FIG. 4.

The illustration of number of sensors 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
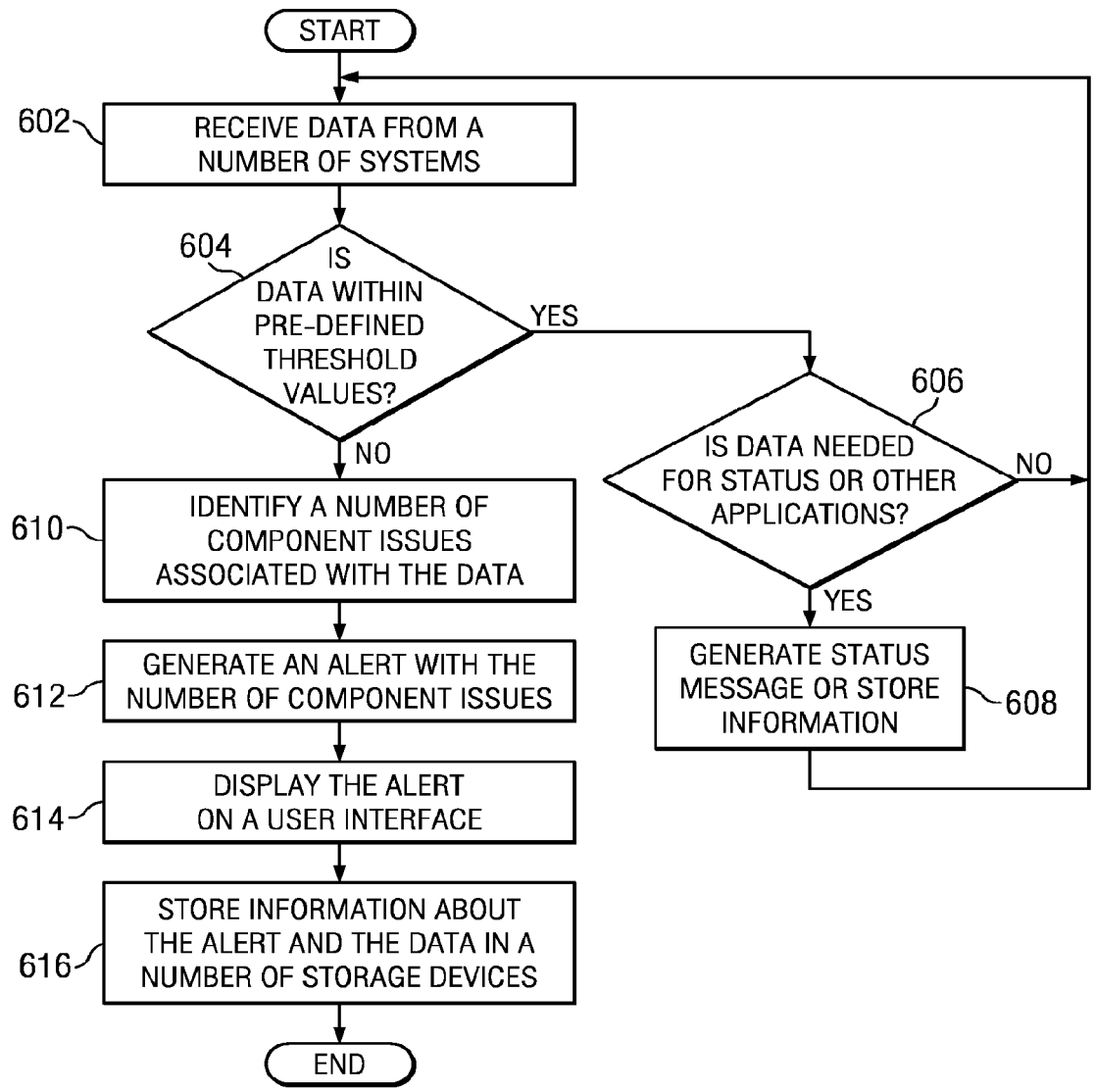
FIG. 6 is an illustration of a flowchart of a process for managing the health of landing gear components on-board a vehicle in accordance with an advantageous embodiment.

With reference now to FIG. 6, an illustration of a flowchart of a process for managing the health of landing gear components on-board a vehicle is depicted in accordance with an advantageous embodiment. The process in FIG. 6 may be implemented by a health management system, such as health management system 302 in FIG. 3 using health manager 336, for example.

The process begins by receiving sensor data from a number of systems (operation 602). The number of systems may be systems such as sensor system 312 and/or other aircraft systems 314 in FIG. 3. The data received may be from the vehicle control systems relative to the vehicle speed, attitude, and control inputs, for example. The data received may also be from a sensor system associated with landing gear components and configured to detect the health and status of a number of landing gear components. The process determines whether the data received is within pre-defined threshold values (operation 604). The pre-defined threshold values may be configured by a user or default values associated with a specific vehicle and/or landing gear component, for example.

If a determination is made that the data is within the pre-defined threshold values, the process determines whether the data is needed for status or other applications (operation 606). If a determination is made that the data is needed for status or for other applications, such as to calculate other metrics, the process generates a status message or stores information (operation 608), and returns to operation 602. Status and other applications may include, for example, monitoring and recording actual values, even if within thresholds, to calculate other metrics such as center of gravity, number of landings remaining for tires or brakes, fatigue life expended, tire pressure, tire temperature, and the like.

If a determination is made in operation 604 that the data is not within the pre-defined threshold values, the process identifies a number of component issues associated with the data (operation 610). A component issue may be, for example, a tire pressure outside an expected value.

The process generates an alert with the number of component issues (operation 612). The alert may be generated by a processor unit, such as onboard processor unit 308 in FIG. 3, for example. The alert may be a status message, in one illustrative example. In another illustrative example, the alert may be a warning of a value outside a threshold. The process displays the alert on a user interface (operation 614). The user interface may be, for example, user interface 320 of aircraft 306. The process then stores information about the alert and the data in a number of storage devices (operation 616), with the process terminating thereafter. In another advantageous embodiment, the process may continually loop from operation 616 back to operation 602, for example.

Figure 7:
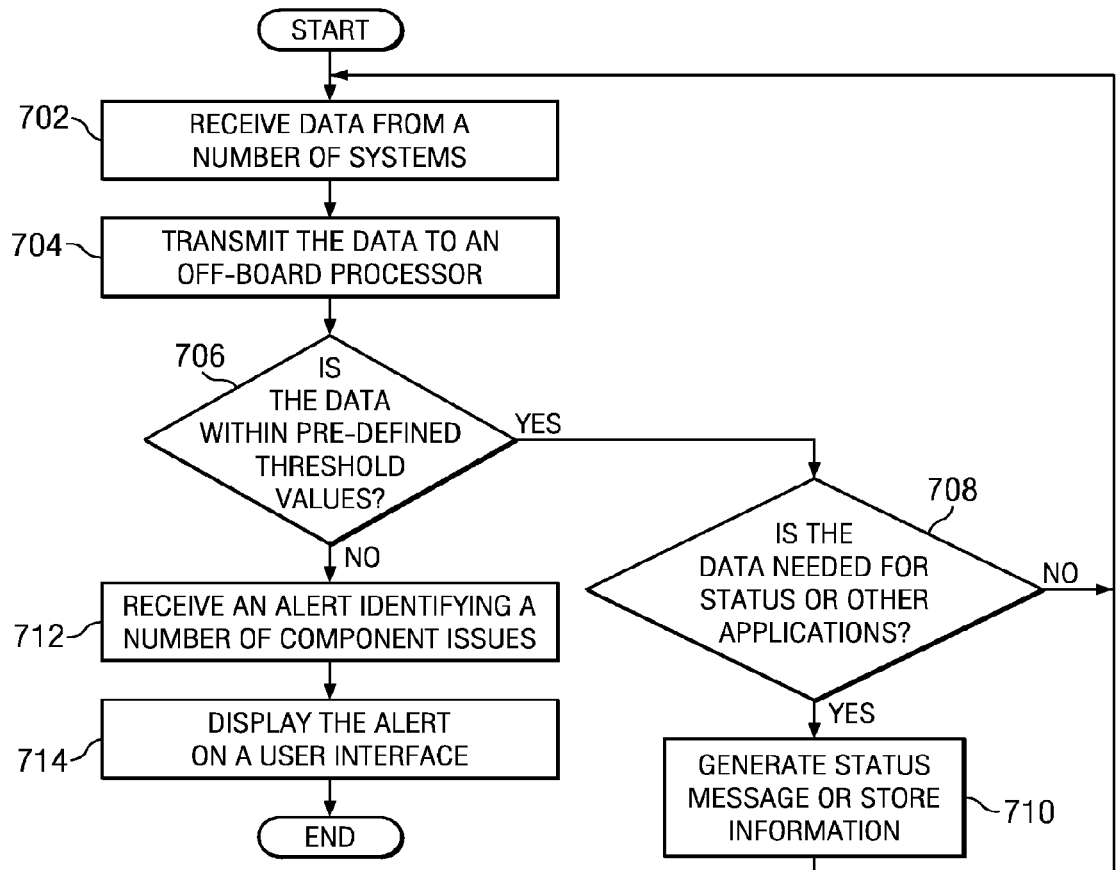
FIG. 7 is an illustration of a flowchart of a process for managing the health of landing gear components off-board a vehicle in accordance with an advantageous embodiment.

With reference now to FIG. 7, an illustration of a flowchart of a process for managing the health of landing gear components off-board a vehicle is depicted in accordance with an advantageous embodiment. The process in FIG. 7 may be implemented by a health management system, such as health management system 302 in FIG. 3.

The process begins by receiving data from a number of systems (operation 702). The number of systems may include, for example, sensor system 312 and/or other aircraft systems 314 in FIG. 3 using health manager 336. The process transmits the data to an off-board processor (operation 704), such as health manager 346 in FIG. 3, for example. The off-board processor may be located in a remote location, such as remote location 304 in FIG. 3, for example. The information may be processed at the remote location, in this example. The process determines whether the data received is within pre-defined threshold values (operation 706). The pre-defined threshold values may be configured by a user or default values associated with a specific vehicle and/or landing gear component, for example.

If a determination is made that the data is within the pre-defined threshold, the process determines whether the data is needed for status or other applications (operation 708). If a determination is made that the data is not needed for status or other applications, the process returns to operation 702. If a determination is made that the data is needed for status or other applications, the process generates a status message or stores information (operation 710), before returning to operation 702.

If a determination is made that the data is not within the pre-defined threshold values, the process receives an alert identifying a number of component issues (operation 712). The process displays the alert on a user interface (operation 714, with the process terminating thereafter. In another advantageous embodiment, the process may return to operation 702 from operation 714, maintaining a continuous looping process, for example.

Figure 8:
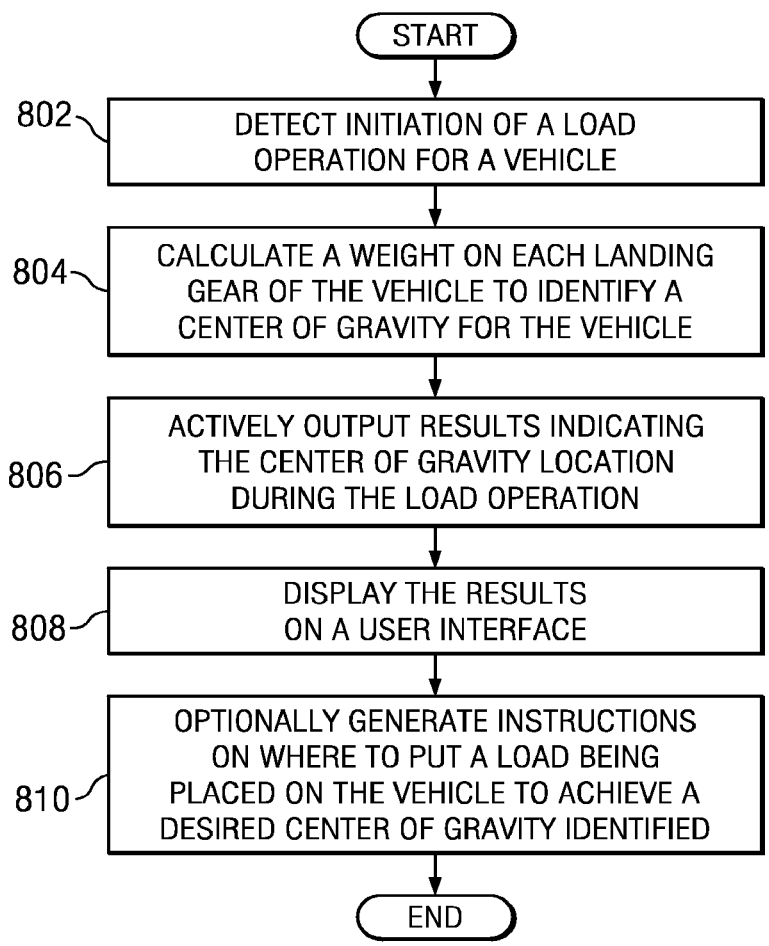
FIG. 8 is an illustration of a flowchart of a process for managing a vehicle center of gravity in accordance with an advantageous embodiment.

With reference now to FIG. 8, an illustration of a flowchart of a process for managing a vehicle center of gravity is depicted in accordance with an advantageous embodiment. The process in FIG. 8 may be implemented by a health management system, such as health management system 302 in FIG. 3 using health manager 336 and/or health manager 346, for example.

The process begins by detecting initiation of a load operation for a vehicle (operation 802). A load operation may include cargo loading, baggage loading, passenger loading, resource loading, fueling of the aircraft, and/or any other suitable load operation.

The process calculates a weight on each landing gear of the vehicle to identify a center of gravity for the vehicle (operation 804). The process may identify the center of gravity using an algorithm to process the weight from each landing gear, for example. The process actively outputs results indicating the center of gravity location during the load operation (operation 806). The process displays the results on a user interface (operation 808), where a user may view the results and determine the desired location for a load being placed on the vehicle, for example. The process optionally generates instructions on where to place a load on the vehicle to achieve the desired center of gravity (operation 810), with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account that current inspection frequency of landing gear suite components by maintenance personnel requires aircraft operators to employ additional personnel and locate them strategically within their network. Personnel are required to manually and visually inspect appropriate measurands, record the results, and take appropriate actions. Human error is a by-product of the manual inspection and calculation of these processes.

Current inspection processes result in maintenance actions that are reactive in nature, resulting in gate delays and cancelled flights. These inspections occur at discrete intervals, which encompass multiple flights, thus providing the potential for issues to arise unnoticed between individual flights. The information collected during these current processes is not available to maintenance and operation planners in a sufficiently timely manner to make the most efficient use of the aircraft.

Thus, the different advantageous embodiments provide a system and methods for evaluating and managing the current and future health of the landing gear suite of components. The aircraft's center of gravity is also actively managed during loading operations. Appropriate measurands are sensed, sensor data is collected and processed, transmitted when necessary, and reasoning is performed on the data to generate and present actionable maintenance and operationally pertinent information to appropriate users.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for managing the health of landing gear components associated with an aircraft, comprising:
   a processor unit positioned remote from the aircraft, the processor unit configured to receive data about a number of landing gear components associated with the aircraft, determine whether the data meets a first threshold, manage the health of the number of landing gear components if the data meets the first threshold, and monitor the data for a second threshold; and
   a communications unit configured to receive the data and provide the data to the processor unit.

2. The apparatus of claim 1, wherein the processor unit plans maintenance for the number of landing gear components based on the data, the first threshold, and the second threshold.

3. The apparatus of claim 1 further comprising:
   a user interface, wherein the processor units provides information to the user interface to display the information about the number of landing gear components.

4. The apparatus of claim 1, wherein the processor unit is further configured to generate a number of status messages associated with the number of landing gear components.

5. The apparatus of claim 1, wherein receiving the information is triggered by an event selected from the group consisting of landing gear retraction, landing gear extension, or a time from landing gear retraction or landing gear extension.

6. The apparatus of claim 1, wherein the processor unit is further configured to store information about the number of landing gear components.

7. The apparatus of claim 1, wherein the processor unit is configured to present alerts based on the data exceeding either of the first threshold and the second threshold.

8. The apparatus of claim 1, wherein the data about the number of landing gear components comprises sensor system information.

9. The apparatus of claim 8, wherein the processor unit is further configured to format the sensor system information and process the sensor system information by a number of algorithms after formatting.

10. The apparatus of claim 8, wherein the number of landing gear components include tires and brakes and the data includes tire pressure and braking torque.

11. The apparatus of claim 8, wherein the data further includes tire temperature and brake temperature.

12. The apparatus of claim 8, wherein the sensor system information includes information from a number of RFID tags associated with the number of landing gear components, the data including RFID configuration information for the number of landing gear components.

13. A method for managing the health of a number of landing gear components associated with an aircraft, the method comprising:
receiving in a processor unit positioned remote from the aircraft data about a number of landing gear components associated with the aircraft;
determining whether the data meets a first threshold;
managing the health of the number of landing gear components if the data meets the first threshold;
monitoring the data for a second threshold; and
planning maintenance for the number of landing gear components based on the data, the first threshold, and the second threshold.

14. The method of claim 13 further comprising:
the processor unit generating information about the number of landing gear components; and
a user interface displaying the information.

15. The method of claim 13, further comprising the processor unit generating a number of status messages associated with the number of landing gear components.

16. The method of claim 13, further comprising storing information about the number of landing gear components.

17. The method of claim 13, further comprising presenting alerts based on the data exceeding either of the first threshold and the second threshold.

18. A system for managing the health of landing gear components associated with an aircraft, comprising:
a first processor unit onboard the aircraft, the first processor unit configured to monitor for a first threshold based on data received from a number of systems onboard the aircraft that are configured to generate data about the landing gear components;
a communications unit configured to receive the data and provide the data to a second processor unit when the first threshold is exceeded, the second processor unit being offboard the aircraft; and
wherein the second processor unit is configured to receive the data from the communications unit, determine whether the data meets a second threshold, and plan maintenance for the landing gear components when the data exceeds the second threshold.

19. The system of claim 18 further comprising:
a user interface, wherein the first processor unit and the second processor unit are both configured to provide information to the user interface to display information about the number of landing gear components, to display information about a maintenance plan for the landing gear components, or a combination thereof.

20. The system of claim 18, wherein the first processor unit is further configured to generate a number of status messages associated with the number of landing gear components.

21. The system of claim 18, wherein the processor unit is configured to present alerts based on the data exceeding either of the first threshold and the second threshold.

22. The system of claim 18, wherein the number of systems generates sensor information, the sensor system information including information from a number of radio frequency identification (RFID) tags associated with the number of landing gear components, the data including RFID configuration information for the number of landing gear components.

* * * * *

UNITED STATES PATENT AND TRADEMARK OFFICE
CERTIFICATE OF CORRECTION

PATENT NO. : 9,671,314 B2  
APPLICATION NO. : 14/246143  
DATED : June 6, 2017  
INVENTOR(S) : Followell et al.

Page 1 of 1

It is certified that error appears in the above-identified patent and that said Letters Patent is hereby corrected as shown below:

On the Title Page

In the ABSTRACT, Sentence 3, change "manage health" to -- manage the health --

In the Claims

Column 14, Line 62, change "units" to -- unit --
    Line 63-64, change "information to the user interface to display the information about" to
        -- data to the user interface to display the data about --
Column 15, Line 1-2, change "the information" to -- the data --
    Line 11, change "first threshold and the second" to -- first threshold or the second --
Column 16, Line 1, change "claim 13, further comprising" to -- claim 13 further comprising: --
    Line 4, change "claim 13, further comprising" to -- claim 13 further comprising: --
    Line 6, change "claim 13, further comprising" to -- claim 13 further comprising: --

Signed and Sealed this
Tenth Day of October, 2017

Joseph Matal
*Performing the Functions and Duties of the
Under Secretary of Commerce for Intellectual Property and
Director of the United States Patent and Trademark Office*